US012375857B2

(12) United States Patent
Cheng et al.

(10) Patent No.: US 12,375,857 B2
(45) Date of Patent: *Jul. 29, 2025

(54) HIGHLY COMPLIANT MINIATURE TRANSDUCER

(71) Applicant: Bose Corporation, Framingham, MA (US)

(72) Inventors: Lei Cheng, Wellesley, MA (US); Andrew D. Munro, Northborough, MA (US); Mark A. Hayner, Belmont, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,405

(22) Filed: May 3, 2024

(65) Prior Publication Data

US 2024/0292154 A1 Aug. 29, 2024

Related U.S. Application Data

(63) Continuation of application No. 17/636,097, filed as application No. PCT/US2020/047313 on Aug. 21, 2020, now Pat. No. 12,010,497.

(Continued)

(51) Int. Cl.
*H04R 7/04* (2006.01)
*H04R 1/10* (2006.01)
(Continued)

(52) U.S. Cl.
CPC ............ *H04R 7/20* (2013.01); *H04R 1/1016* (2013.01); *H04R 1/1041* (2013.01); *H04R 1/1075* (2013.01); *H04R 7/127* (2013.01)

(58) Field of Classification Search
CPC ...... H04R 7/20; H04R 1/1016; H04R 1/1041; H04R 1/1075; H04R 7/127
(Continued)

(56) References Cited

U.S. PATENT DOCUMENTS 5,430,804 A * 7/1995 Wijnker ................. H04R 9/046 381/408
9,712,291 B2 * 7/2017 Berggren .............. H04L 5/0005
(Continued)

FOREIGN PATENT DOCUMENTS

NO 9101075 A1 1/1991

OTHER PUBLICATIONS

PCT International Search Report and Written Opinion for International Application No. PCT/US2020/047313, dated Nov. 23, 2020, 20 pages.

(Continued)

*Primary Examiner* — William J Deane, Jr.
(74) *Attorney, Agent, or Firm* — Hoffman Warnick LLC

(57) ABSTRACT

Various implementations include miniature loudspeaker drivers. In some aspects, an electro-acoustic driver includes: a diaphragm having a surface area configured to radiate acoustic energy; a suspension coupled to the diaphragm, wherein the suspension is non-planar in a resting position; and a support structure coupled to the suspension and having an outer linear dimension in a plane of the support structure of approximately 6.0 millimeters (mm) or less, wherein the surface area of the diaphragm is at least 49% of an overall cross-sectional area of the electro-acoustic driver in the plane of the support structure; and wherein the suspension between an inner side wall of the support structure and the diaphragm has a rounded shape in the resting position.

20 Claims, 7 Drawing Sheets

Related U.S. Application Data

(60) Provisional application No. 62/889,784, filed on Aug. 21, 2019.

(51) Int. Cl.
*H04R 7/12* (2006.01)
*H04R 7/20* (2006.01)

(58) Field of Classification Search
USPC ........................................................ 381/74, 120
See application file for complete search history.

(56) References Cited

U.S. PATENT DOCUMENTS

| | | | | |
|---|---|---|---|---|
| 10,433,048 | B2 * | 10/2019 | Tsang | H04R 7/12 |
| 10,484,788 | B1 * | 11/2019 | Kudekar | H04R 1/2834 |
| 10,560,778 | B2 * | 2/2020 | Boyd | H04R 7/20 |
| 10,708,694 | B2 * | 7/2020 | Ilkorur | H04R 7/16 |
| 2009/0028375 | A1 * | 1/2009 | Richoux | H04R 9/025 381/412 |
| 2016/0057543 | A1 * | 2/2016 | Salvatti | H04R 9/04 381/398 |
| 2017/0078800 | A1 | 3/2017 | Guthy et al. | |
| 2017/0359655 | A1 | 12/2017 | Sears et al. | |
| 2018/0270569 | A1 * | 9/2018 | Boyd | H04R 7/20 |
| 2019/0069076 | A1 | 2/2019 | Tsang et al. | |
| 2019/0082262 | A1 * | 3/2019 | Ilkorur | H04R 9/06 |
| 2019/0349689 | A1 * | 11/2019 | Hayner | H04R 9/06 |
| 2020/0092647 | A1 * | 3/2020 | Palmer | H04R 3/04 |

OTHER PUBLICATIONS

Communication Pursuant to Article 94(3) EPC from European Application No. 20768159.4 dated Jun. 26, 2024, 6 pages.

* cited by examiner

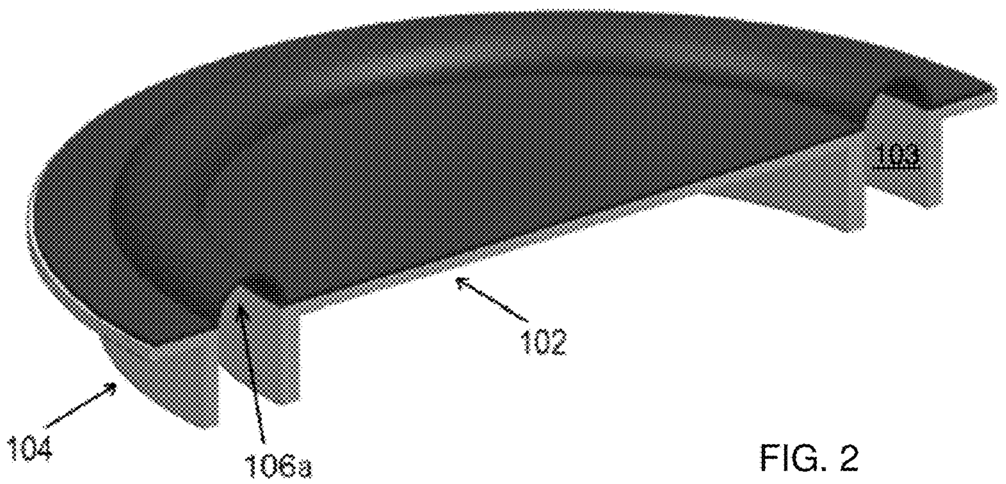
FIG. 2
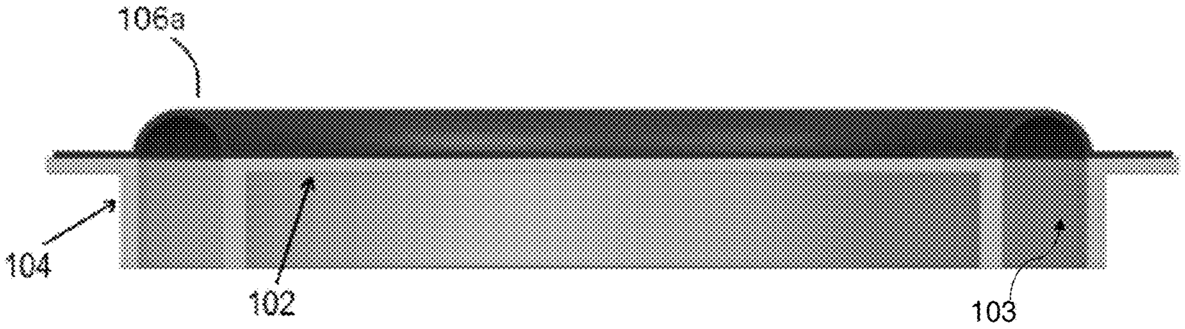

HIGHLY COMPLIANT MINIATURE TRANSDUCER

PRIORITY CLAIM

This application claims priority to U.S. patent application Ser. No. 17/636,097 (Highly Compliant Miniature Transducer, filed Feb. 17, 2022), which claims priority to PCT/US2020/047313 (Highly Compliant Miniature Transducer, filed Aug. 21, 2020), which claims priority to U.S. Provisional Patent Application Ser. No. 62/889,784 (Miniature Transducer Having High Compliance, filed on Aug. 21, 2019), each of which is hereby incorporated by reference in its entirety.

TECHNICAL FIELD

This disclosure generally relates to loudspeakers. More particularly, the disclosure relates to miniature transducers with a compliant suspension or surround.

BACKGROUND

Modern in-ear headphones, or earbuds, typically include microspeakers. The microspeaker may include a coil wound on a bobbin that is attached to an acoustic diaphragm. Motion of the diaphragm due to an electrical signal provided to the coil results in generation of an acoustic signal that is responsive to the electrical signal. The microspeaker may include a frame and/or housing, such as a sleeve or tube, which encloses the bobbin and coil. The microspeaker may also include a magnetic structure. As the size of the earbud decreases, it becomes increasingly difficult to fabricate the acoustic diaphragm and surrounding suspension in a manner that allows broad spectrum coverage.

SUMMARY

All examples and features mentioned below can be combined in any technically possible way.

Various implementations include highly compliant electro-acoustic drivers, along with related diaphragm assemblies and in-ear audio devices.

In some particular aspects, an electro-acoustic driver includes: a cone having a surface area configured to radiate acoustic energy; a suspension coupled to the cone, wherein the suspension is non-planar in a resting position; and a support structure coupled to the suspension and having an outer linear dimension in a plane of the support structure of approximately 6.0 millimeters (mm) or less, where the surface area of the cone is at least 49% of an overall cross-sectional area of the electro-acoustic driver in the plane of the support structure.

In other particular aspects, a diaphragm assembly for an electro-acoustic driver includes: a cone having a surface area configured to radiate acoustic energy; and a suspension coupled to the cone, wherein the suspension is non-planar in a resting position, and where the suspension comprises an elastomer and provides a stiffness of approximately 10 N/m or less.

In additional particular aspects, an in-ear audio device includes: a controller; and an electro-acoustic driver coupled with the controller, the electro-acoustic driver having: a cone having a surface area configured to radiate acoustic energy; a suspension coupled to the cone, wherein the suspension is non-planar in a resting position; and a support structure coupled to the suspension and having an outer linear dimension in a plane of the support structure of approximately 6.0 millimeters (mm) or less, where the surface area of the cone is at least 49% of an overall cross-sectional area of the electro-acoustic driver in the plane of the support structure.

In further particular aspects, an electro-acoustic driver includes: a cone having a surface area configured to radiate acoustic energy; a suspension coupled to the cone, wherein the suspension is non-planar in a resting position; and a support structure coupled to the suspension and having an outer linear dimension in a plane of the support structure of approximately 6.0 millimeters (mm) or less, wherein the surface area of the cone is at least 49% of an overall cross-sectional area of the electro-acoustic driver in the plane of the support structure; and wherein the suspension between an inner side wall of the support structure and the cone has a rounded shape in the resting position.

Implementations may include one of the following features, or any combination thereof.

In some cases, the suspension provides a stiffness of approximately 20 Newton/meter (N/m) or less.

In certain aspects, the suspension provides a stiffness of approximately 10 N/m or less, or approximately 8 N/m or less.

In particular implementations, the support structure is circular, and the outer linear dimension comprises a diameter of the support structure as measured in a direction perpendicular to an axis of motion of cone while radiating acoustic energy.

In some aspects, the suspension has an approximately half-rolled shape in the resting position.

In certain cases, the outer linear dimension of the support structure is equal to or less than approximately 5.2 mm, approximately 4.2 mm, approximately 4.0 mm, or approximately 3.0 mm.

In particular implementations, the suspension includes an elastomer.

In some cases, the elastomer is molded.

In certain aspects, the surface area of the cone has a portion that is not covered by the elastomer.

In particular aspects, the suspension provides a stiffness of approximately 25 Newton/meter (N/m) or less, and the surface area is from approximately 7 square millimeters ($mm^2$) to approximately 40 $mm^2$.

In some implementations, an outer dimension (e.g., diameter) of the suspension is from approximately 2 mm to approximately 10 mm.

In certain aspects, the driver defines an acoustic volume of approximately 45-90 cubic millimeters, and the stiffness of the suspension is maintained at or below approximately 25 N/m while the electro-acoustic driver radiates acoustic energy at up to approximately 130 decibels of sound pressure level (dBSPL) to approximately 145 dBSPL.

In particular implementations, the surface area is less than approximately 60 $mm^2$. In additional implementations, the surface area is less than approximately 40 $mm^2$.

In some aspects, a ratio of the surface area to a stiffness of the suspension is at least approximately 50 dB relative to 1 millimeter cubed per Newton (1 $mm^3$/N).

In certain aspects, a ratio of the surface area to the stiffness of the suspension is 360 $mm^3$/N or greater.

In certain cases, the surface area of the cone is non-planar and acts as a piston in radiating acoustic energy.

In some aspects, the non-planar cone is dome-shaped.

In certain cases, a ratio of an outer diameter of the electro-acoustic driver (D) to a maximum excursion of the cone ($X_{max}$) is equal to approximately: D: $X_{max}$; 5.0-5.3 mm: +/−160 um; 4.0-4.2 mm: +/−250 um; or 4.0-4.2 mm: +/−320 um.

In some aspects, an earphone with in-ear active noise cancelation includes the electro-acoustic driver.

In particular cases, a high-fidelity earphone or a hearing aid includes the electro-acoustic driver.

In certain aspects, the suspension provides a stiffness of approximately 35 Newton/meter (N/m) or less, wherein the stiffness enhances a spectral output of the electro-acoustic driver.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

FIG. 2 is a schematic diagram of example sub-components of a miniature transducer according to various implementations.

Figure 1:
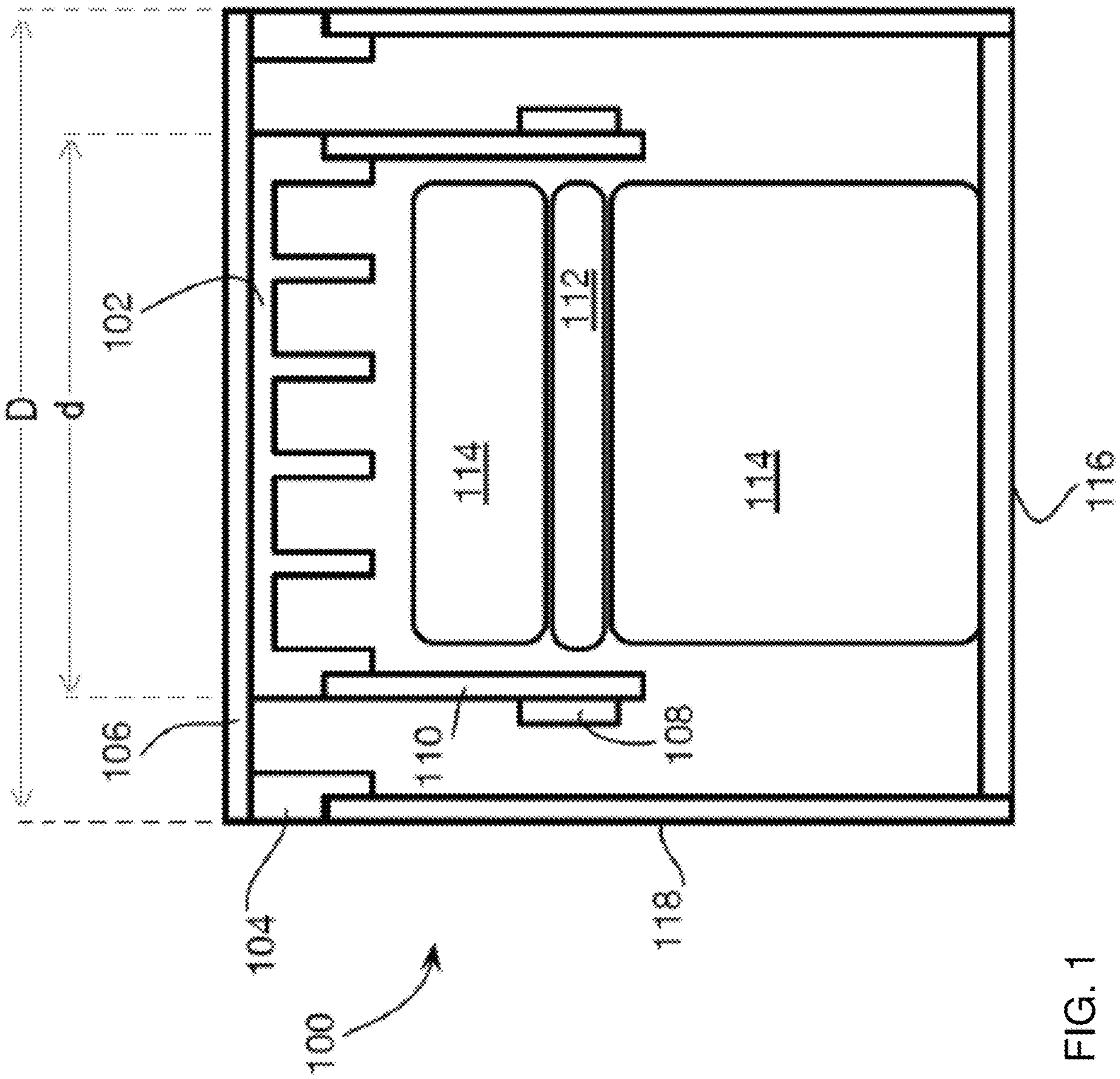
FIG. 1 is a schematic depiction of an example miniature transducer according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a highly compliant surround or suspension can improve the performance of a microspeaker.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value+/−a margin of error, such as a measurement error, which may range from 1 percent up to 5 percent in terms of dimensional tolerance in some cases.

In contrast to conventional microspeakers, the microspeakers disclosed according to various implementations include a highly compliant (i.e., low stiffness) surround or suspension. At least one benefit of such high-compliance transducers is their broader spectral output when compared with conventional microspeakers, e.g., a higher acoustic displacement and output power across a larger range of frequencies, enabling output at lower frequencies.

This disclosure is related to U.S. patent application Ser. No. 15/182,014 filed on Jun. 14, 2016, now U.S. Pat. No. 9,986,355, titled ASSEMBLY AID FOR MINIATURE TRANSDUCER, and to U.S. patent application Ser. No. 15/182,055 also filed on Jun. 14, 2016, now U.S. Pat. No. 9,942,662, titled ELECTRO-ACOUSTIC DRIVER HAVING COMPLIANT DIAPHRAGM WITH STIFFENING ELEMENT, and to U.S. patent application Ser. No. 15/182,069, also filed on Jun. 14, 2016, titled MINIATURE DEVICE HAVING AN ACOUSTIC DIAPHRAGM, and to U.S. patent application Ser. No. 15/222,539 filed on Jul. 28, 2016, titled FABRICATING AN INTEGRATED LOUDSPEAKER PISTON AND SUSPENSION, each of which is incorporated by reference herein for all purposes.

Acoustic transducers structurally similar to those described in the above referenced patent applications and/or the disclosure herein, and/or assembled in accord with methods similar to those described in the above referenced patent applications or those described herein, may meet dimensional criteria and compliance and/or stiffness criteria in accord with those described herein. For example, stiffness may be expressed as a spring constant and/or compliance may be expressed as an inverse of the spring constant. In the various example implementations herein, the terms "stiffness" and "compliance" refer to the relationship of the axial excursion of the transducer (e.g., cone, or cone and a portion of the suspension), from a nominal or resting position, in response to axial force. In various examples, certain compliance or stiffness criteria are met for a given transducer size, such as may be expressed in terms of diaphragm diameter or surface area and/or total diameter (e.g., diaphragm and suspension system, such as a surround, which may be formed of the same material as the diaphragm). Conventional miniature transducers have rather high stiffness (low compliance) for comparable sizes, but aspects and examples described herein achieve a relatively low stiffness for their size, relative to conventional designs, making them better suited for broader spectrum applications such as high-fidelity earphones, in-ear active noise cancellation, hearing aids, etc.

FIG. 1 illustrates an example transducer 100 that includes a cone (also referred to as a diaphragm) 102 suspended from a support structure 104 by a suspension 106. In various implementations, such as where the transducer 100 is formed in an approximately circular cross-sectional shape, the support structure 104 includes a support ring. In various examples, the suspension 106 includes a layer of compliant material extending over the entire surface of the cone 102, and may form a portion of the cone (e.g., the primary radiating surface area), though in some examples the compliant material of the suspension 106 may not extend over the entire surface of cone 102. The remaining parts of the transducer 100 include a voice coil 108 wound around a bobbin 110, surrounding a coin 112 and magnet(s) 114.

The coin 112 and magnet(s) 114 may be connected to the support ring by a back plate 116 and housing 118, which, like the coin 112, may be formed of ferromagnetic material, such as steel. Electrical current flowing through the voice coil 108 within the field produced by the magnet(s) 114 and shaped by the ferromagnetic parts produces a force on the voice coil 108 in the axial direction. This is transferred to the cone (or, "diaphragm", or "piston") 102 by the bobbin 110, resulting in motion of the cone 102, and the production of sound. The same effects can be used in reverse to produce current from sound, i.e., using the transducer as a microphone or other type of pressure sensor. In other examples, the voice coil 108 may be stationary (e.g., coupled to the back plate 116 and the housing 118) and the magnet(s) 114 may move (e.g., coupled to the cone 102, such as via the bobbin 110).

The transducer 100 has an overall outer diameter, D, which may be the outer diameter of the support structure (e.g., ring) 104, such that the outer diameter of the suspension 106 may be somewhat smaller in some examples. The cone 102 has a cone (or, diaphragm) diameter, d, smaller than the outer diameter, D. In operation, a portion of the suspension 106 may contribute to a radiating surface of the cone 102. Accordingly, the transducer 100 has an effective cone diameter, $d_{eff}$, being of a value between the cone diameter, d, and the outer diameter of the suspension 106. One example of this effective cone diameter ($d_{eff}$) is illustrated in an additional implementation of a transducer 100 in FIG. 3. In some examples, the effective radiating surface may include the cone 102 and about half of the radial width of the suspension 106. An effective radiating area, $S_d$, of the transducer 100 may therefore be more than the physical area of the cone 102.

As variously described, transducers in accord with those herein have outer diameters of approximately 8.0 mm or less, and in many examples have outer diameters of approximately 6.0 mm or less. In various implementations, transducers have a suspension that provides a stiffness of 50 N/m or less, which in many examples have a stiffness of 35 N/m or less, which in many further examples have a stiffness of 25 N/m or less, and in further particular examples have a stiffness of 20 N/m or less, and in even further examples have a stiffness of 10 N/m or less. In certain example implementations, the transducers have a stiffness of 8 N/m or less. While the above descriptions refer to various diameters, many examples may not be circular. For example, the structure overall may be oblong, oval, or have a racetrack shape or other physical structure. In such examples, the overall largest linear dimension in the plane of the support structure (e.g., a plane that is perpendicular to the axis of motion of the cone) may be 8.0 mm or less, and in some particular cases, 6.0 mm or less, and the dimensions and materials of the suspension 106 are selected to result in stiffness of 20 N/m or less, 10 N/m or less, or 8 N/m or less, as described in greater detail below.

As stated above, transducers in accord with those described herein involve an outer diameter of 8.0 mm or less and a stiffness of 50 N/m or less, which corresponds to a compliance of 20 mm/N or greater. In particular implementations, transducers have an outer diameter of 6.0 mm or less and a stiffness of 25 N/m or less, corresponding to a compliance of 40 mm/N or greater. Conventional transducers having an outer diameter of 8.0 mm or less (and, in various particular examples, 6.0 mm or less) have much lower compliance (higher stiffness) and may therefore be less suitable for certain applications, such as efficient reproduction of high fidelity (broad spectrum) audio and/or active noise reduction in various earphone or in-ear form factors. Conventional transducers of similar outer dimensional scales require wide suspensions 106 to reduce stiffness, thus significantly lowering the effective cone (or, diaphragm) radiating area of the transducer and thereby severely limiting acoustic output power. Transducers in accord with the various implementations described herein, however, achieve larger cones with narrower suspensions in the same overall outer diameter by a selection of materials and thicknesses not used in conventional transducers of comparable dimension.

In various examples, the material of the suspension 106 may be a polyurethane, which may be an elastomeric polyurethane, or an elastomer such as liquid silicone rubber (LSR). Suitable polyurethanes may include thermoset polyurethanes or thermoplastic polyurethanes (TPUs). Other materials may also be suitable. The suspension 106 (and covering portion of the cone 102 in some examples) may be formed by various methods, such as deposition, extrusion, thermo-forming, injection molding, or others.

Figure 3:
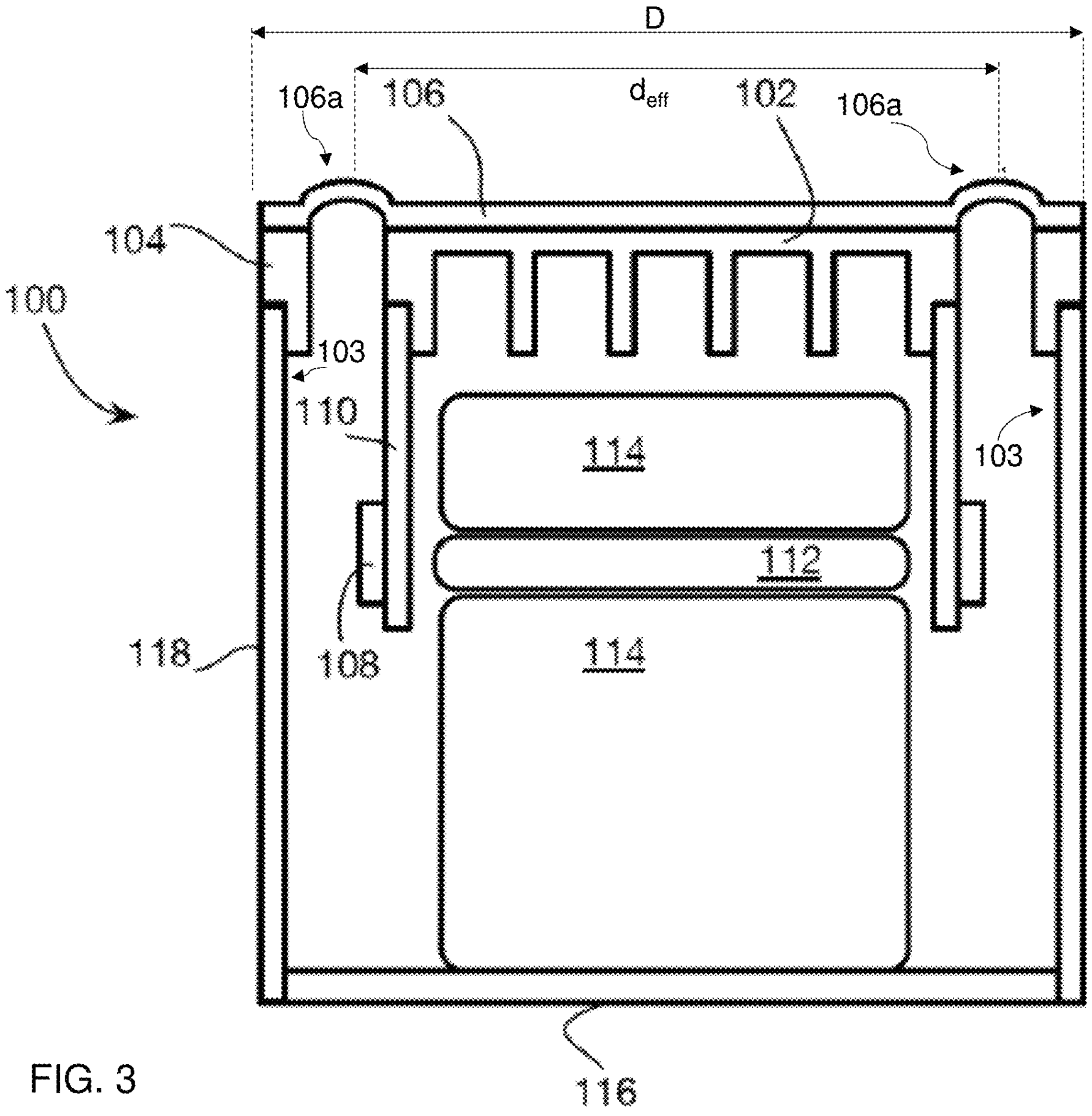
FIG. 3 is a schematic depiction of an example miniature transducer according to various additional implementations.

FIG. 2 illustrates an additional implementation of a suspension 106*a* having a non-planar shape in a resting position. In this example, the suspension 106*a* has a rounded or "half-roll" shape, e.g., half-rolled shape in the resting position. Suspension 106*a* is shown extending between the inner side wall 103 (also shown in FIGS. 3, 5, and 6) of support structure 104 and the diaphragm 102. FIG. 3 illustrates the suspension 106*a* from FIG. 2 as part of the transducer 100, similar to that of FIG. 1. In various examples having a half-roll suspension 106*a*, a material such as LSR (silicone) having a thickness of about 10 to 50 microns may be suitable, and in other examples polyurethane (of any variety described herein) having a thickness of about 5 to 30 microns may be suitable. As mentioned above, half-roll suspensions may be formed by similar methods, such as deposition, extrusion, thermo-forming, injection molding, or others. In certain implementations, e.g., where the suspension 106*a* includes an elastomer (e.g., molded elastomer), at least a portion of the surface area of the cone 102 is not covered by the elastomer.

In various examples, a polyurethane suspension 106*a* has a thickness in the range of 5 to 20 microns, while in some examples the polyurethane suspension 106*a* has a thickness in the range of 5 to 10 microns. In a nominal example, the polyurethane suspension 106*a* may have a thickness of 10 microns.

In various examples, an LSR suspension 106*a* has a thickness in the range of 30 to 60 microns, while in some examples the LSR suspension 106*a* has a thickness in the range of 45 to 55 microns. In a nominal example, the LSR suspension 106*a* may have a thickness of 50 microns.

In various examples, the transducer 100 has an outer diameter (D) of 8.0 mm or less, and in some cases, an outer diameter (D) of 6.0 mm or less. In certain examples, the transducer 100 has a cone (or, diaphragm) 106*a* with a diameter (d) of 6.5 mm or less. In various examples, the outer diameter, D, is 8.0 mm or less and the cone diameter, d, has a value of about 59% to 63% of the outer diameter, D. In at least one example, a transducer has an outer diameter of about 8.0 mm and a cone diameter (d) of about 5.9 mm. An alternate example has an outer diameter (D) of 5.3 mm or less and a cone diameter of about 3.9 mm. Yet another example has an outer diameter (D) of about 4.0 mm or less and a cone diameter (d) of about 2.9 mm. In each of these examples, a suspension 106*a* formed of LSR having thickness of about 50 microns yields a stiffness less than 35 N/m. Further, in each of these examples, a suspension 106*a* formed of polyurethane of thickness of about 5 to 10 microns yields a stiffness less than 50 N/m. Similarly, an LSR of appropriate thickness may be selected for a half-roll suspension 106*a* to yield a stiffness of less than 50 N/m or less than 35 N/m.

In still further particular implementations, e.g., as illustrated in FIG. 3, the transducer 100 has an outer diameter (D), as measured by the dimension of the support structure 104, that is approximately 6.0 mm or less (in a plane of the support structure 104, e.g., perpendicular to the motion axis of the cone 102). In these cases, the surface area ($S_d$) of the cone 102 is at least 49% of an overall cross-sectional area of the transducer 100 (based on outer diameter, D) in the plane of the support structure 104. In certain of these cases, the outer dimension (e.g., outer diameter, D) of support structure 104 is equal to or less than approximately 5.2 mm. In further of these cases, the outer dimension (e.g., outer diameter, D) of support structure 104 is equal to or less than approximately 4.2 mm. In still further of these cases, the outer dimension (e.g., outer diameter, D) of support structure 104 is equal to or less than approximately 4.0 mm. In additional cases, the outer dimension (e.g., outer diameter, D) of support structure 104 is equal to or less than approximately 3.0 mm.

In some cases, with reference to FIGS. 2 and 3, the outer dimension (e.g., diameter) of the suspension 106*a* is approximately 2 mm up to approximately 10 mm. In certain of these cases, the surface area (Sa) of the cone 102 is equal to or less than approximately 60 $mm^2$, and in particular cases, is equal to or less than 40 $mm^2$.

In some particular cases, the suspension 106*a* provides a stiffness of approximately 25 Newton/meter (N/m) or less, and the surface area ($S_d$) of the cone 102 is from approximately 7 square millimeters ($mm^2$) to approximately 40 $mm^2$. In particular implementations, a ratio of the surface area ($S_d$) of the cone 102 to a stiffness of the suspension 106 is at least approximately 50 dB to 1 millimeter cubed per Newton (1 $mm^3$/N). In certain cases, a ratio of the surface area to the stiffness of the suspension is 360 $mm^3$/N or greater.

In certain aspects, the transducer 100 defines an acoustic volume of approximately 45 cubic millimeters ($mm^3$) to approximately 90 $mm^3$ (e.g., approximately 48 $mm^3$ to approximately 84 $mm^3$ in some cases). In these cases, the stiffness of the suspension 106*a* is maintained at or below approximately 25 N/m while the electro-acoustic driver radiates acoustic energy at up to approximately 130 decibels of sound pressure level (dBSPL) to approximately 145 dBSPL (and in particular cases, approximately 130 dBSPL to approximately 135 dBSPL).

In still further implementations, a ratio of the outer dimension (e.g., diameter) of the transducer 100 (D) to a maximum excursion of the cone ($X_{max}$) is equal to approximately: D: $X_{max}$; 5.0-5.3 mm: +/−160 um; 4.0-4.2 mm: +/−250 um; or 4.0-4.2 mm: +/−320 um.

While the cone 102 in some embodiments is depicted as being approximately planar, in various particular implementations, the cone 102 is non-planar. As described herein, the cone 102, e.g., non-planar cone, can act as a piston in radiating acoustic energy. In some particular cases, the non-planar cone 102 is dome-shaped.

Figure 4A:
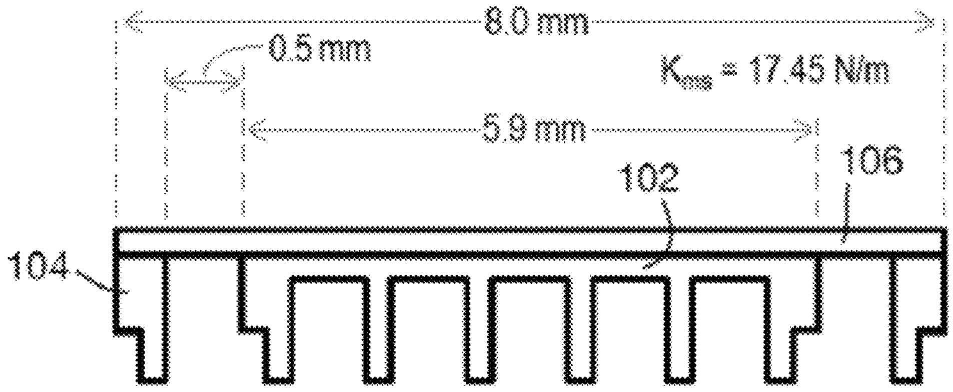
FIGS. 4A-4C are schematic diagrams illustrating example sub-components in a miniature transducer according to various further implementations.
Figure 4B:
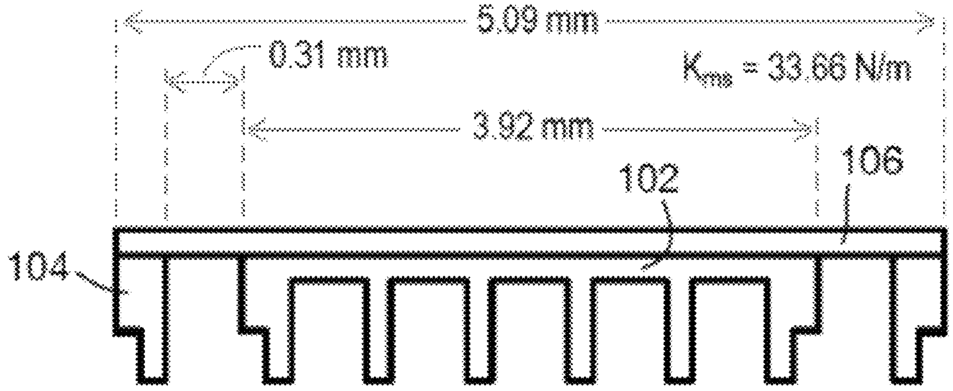
Figure 4C:
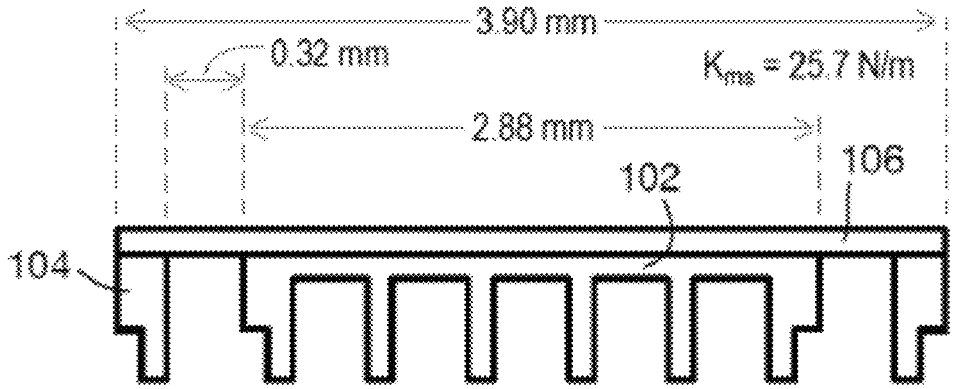
Figure 6:
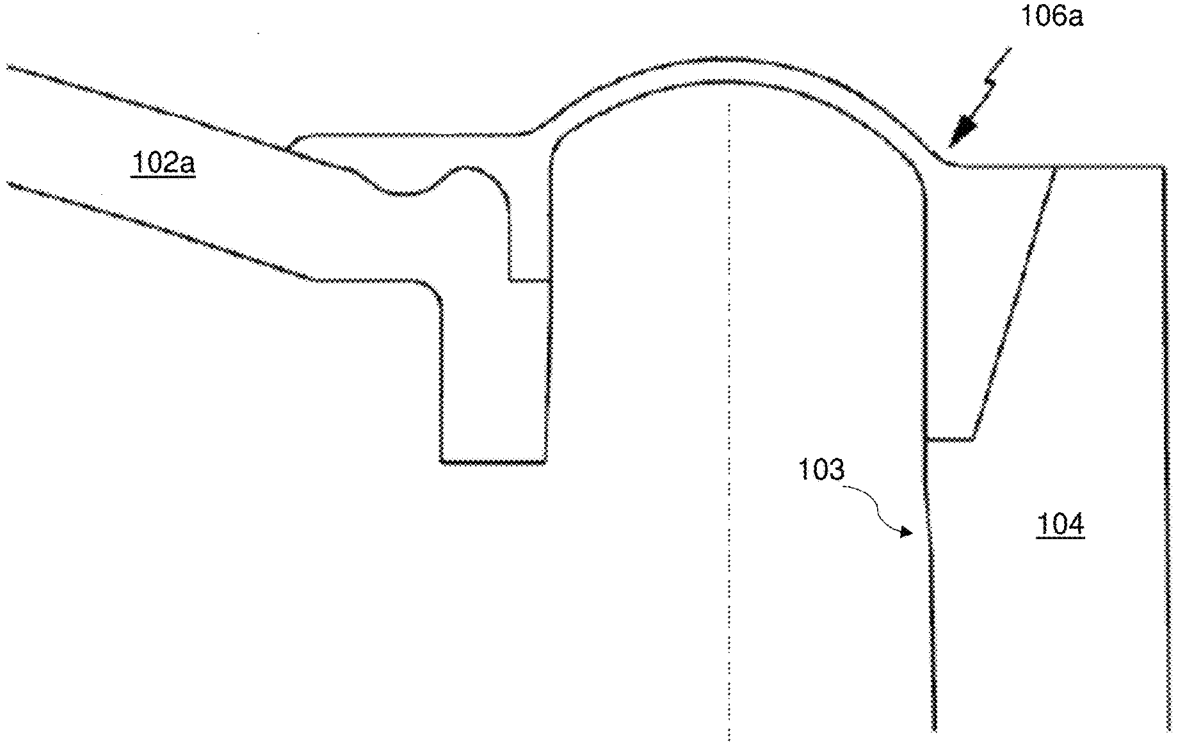
FIG. 6 is a close-up cross-sectional view of the miniature transducer in FIG. 5.

FIGS. 4A-4C illustrate various dimensional examples in accord with those herein that provide suitable stiffness when provided with an LSR suspension of between 30 to 80 micron thickness (nominally 50 micron), or between 10 to 50 micro thickness (nominally 25 micron). In some examples of a polyurethane suspension, a suitable stiffness may be provided by a polyurethane thickness of between 5 to 20 micron thickness (nominally 5 micron). FIG. 4A illustrates an 8.0 mm transducer having a cone diameter of 5.9 mm and a suspension radial width of 0.5 mm. FIG. 4B illustrates a 5.09 mm transducer having a cone diameter of 3.92 mm and a suspension radial width of 0.31 mm. FIG. 4C illustrates a 3.9 mm transducer having a cone diameter of 2.88 mm and a suspension radial width of 0.32 mm. For ease of illustration, only the cone 102, support structure (e.g., support ring) 104, and suspension 106 elements are shown, but each may include additional structural elements similar to those shown in FIGS. 1 and 3. It is understood that in any of the depictions of transducers in FIGS. 4A-4C, the suspension 106 can be replaced with a non-planar suspension, such as suspension 106*a* (FIGS. 2, 3, 6 and 6).

Figure 5:
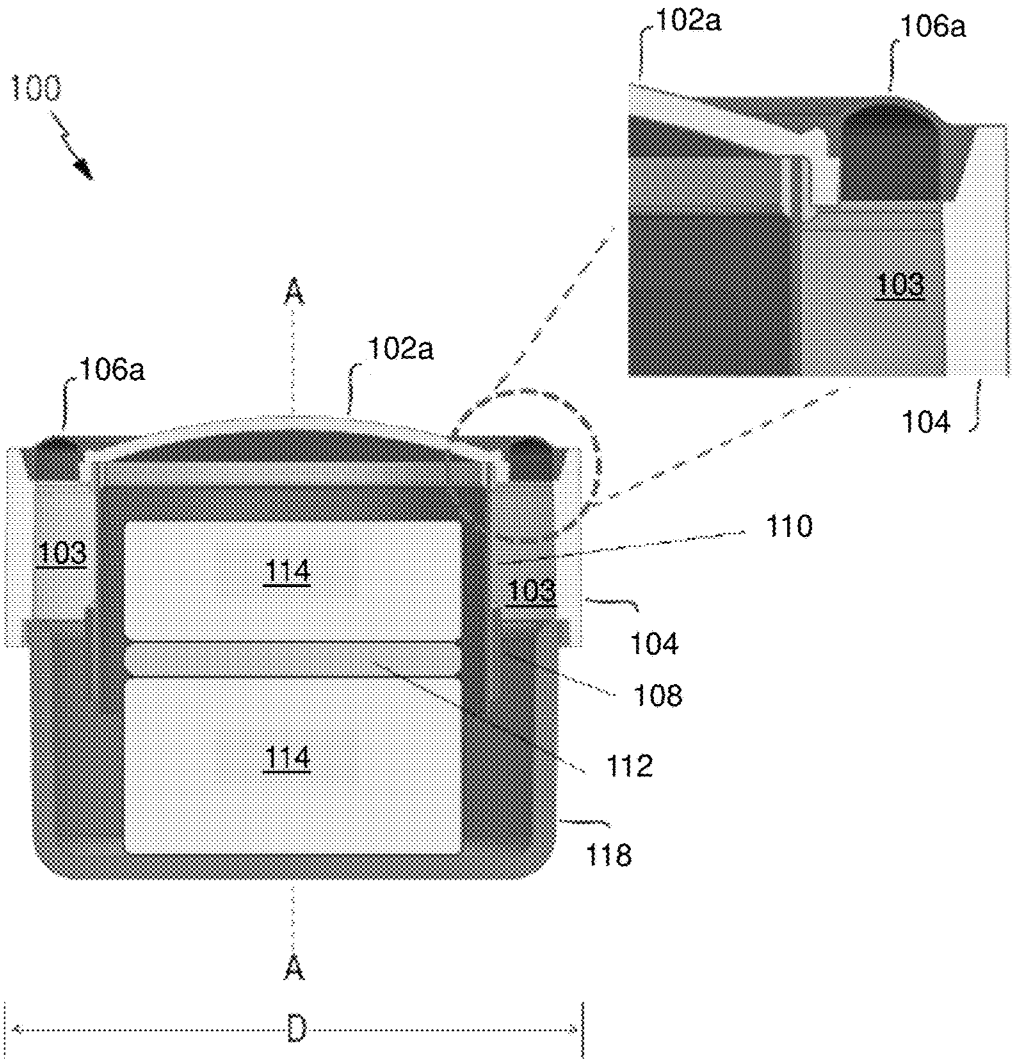
FIG. 5 is a schematic cross-sectional view of a miniature transducer according to various additional implementations.

FIG. 5 shows a schematic perspective view of another transducer 100 according to various implementations. FIG. 6 shows a close-up cross-sectional view of the transducer 100 in FIG. 5. In these cases, the transducer 100 has both a non-planar (e.g., rolled) suspension 106*a*, and a non-planar (e.g., domed) cone 102*a*. That is, in a resting position, the suspension 106*a* in these implementations is non-planar, as is the cone 102*a*. As described according to various implementations herein, the support structure 104 (that is coupled to non-planar suspension 106*a*), has an outer linear dimension (D) that is approximately 6.0 mm or less, where a surface area of cone 102*a* is at least 49% of the overall cross-sectional area of the transducer 100 measured in the plane that is perpendicular to motion axis A. Additional dimensional relationships described according to various additional implementations can be applicable to the transducer 100 depicted in FIGS. 5 and 6.

In each of the above example transducers, and in accord with various examples described herein, the cone diameter, d, is greater than 73% of the outer diameter, D. In other examples, the cone diameter, d, is greater than 70% of the outer diameter, D, and in certain examples the cone diameter, d, is greater than 76% of the outer diameter, D. Conventional transducers of 8.0 mm or less, or 6.0 mm or less, generally have an increased radial width of the suspension, thereby having a smaller cone dimension relative to the outer dimension (D). Transducers in accord with the various implementations herein achieve larger cone dimensions, relative to the outer dimension, and provide higher compliance, than conventional transducers of similar overall size. Other example transducers in accord with those described are not round, but may be oblong, oval, racetrack, etc., for which a diameter ratio may not be meaningful. In such examples, the cone surface area may be greater than 49% of the overall cross-sectional area of the transducer (e.g., as measured in the plane of the support structure, which is substantially perpendicular to the motion axis A of the cone). In some examples, the cone surface area may be greater than 53% of the overall cross-sectional area, and in certain examples, the cone surface area may be greater than 57% of the overall cross-sectional area. In even further implementations, the cone surface area is at least 49% of an overall cross-sectional area of the electro-acoustic driver.

Figure 7:
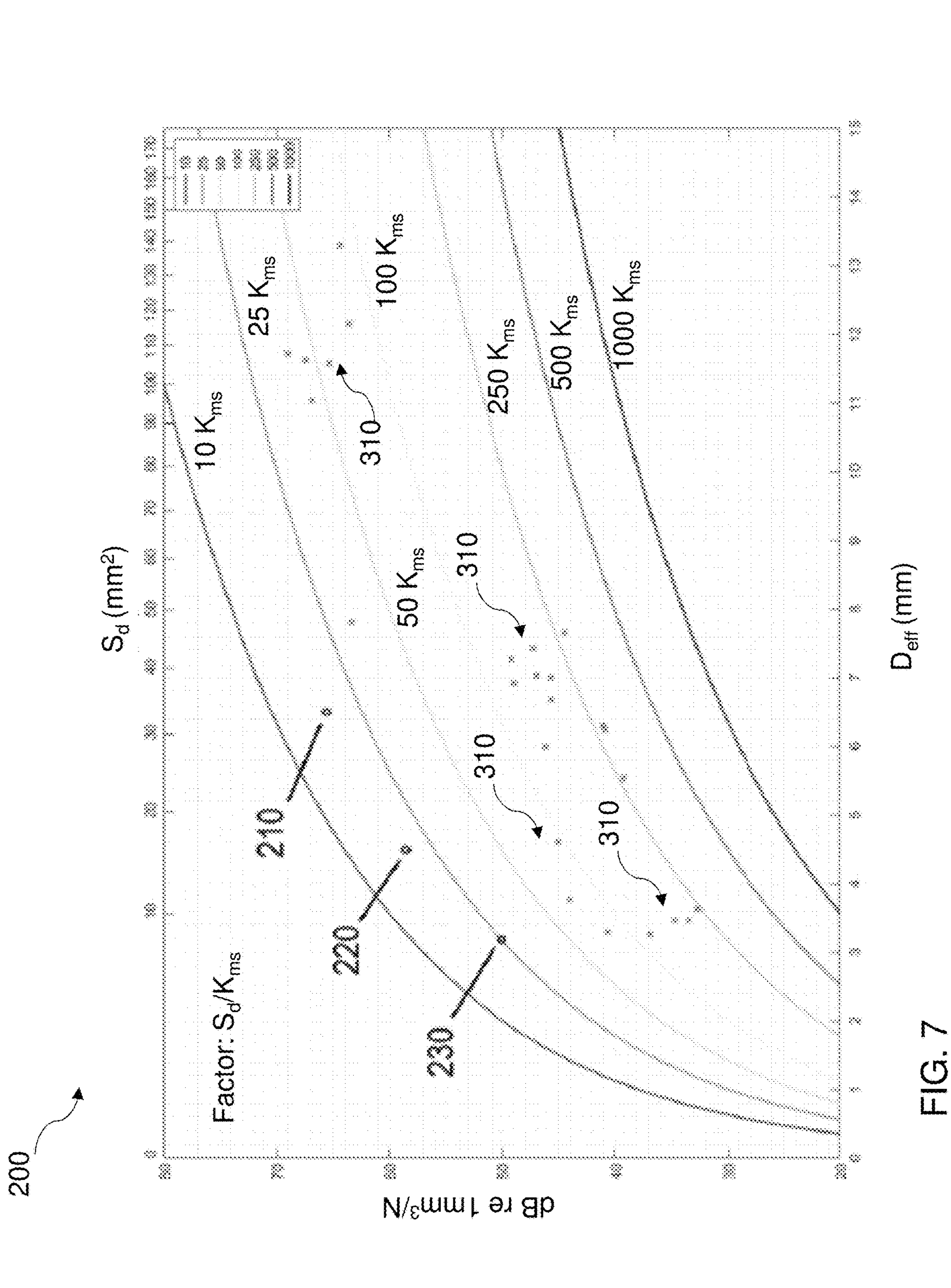
FIG. 7 is a graph illustrating performance metrics for miniature transducers.

FIG. 7 illustrates a graph 200 of an example figure of merit plotted for various transducers. The figure of merit in the graph 200 is a ratio of the effective radiating surface area of a cone, $S_d$, to the stiffness of a suspension system, $K_{ms}=1/C_{ms}$. The figure of merit is expressed in decibels relative to 1 $mm^3$/N, along the Y-axis, with surface area, $S_d$, on the X-axis (at top). The graph 200 illustrates the figure of merit for various transducers when not coupled to an acoustic volume, e.g., on an open baffle. At least three example points 210, 220, 230 are identified and reflect the surface area and figure of merit for three example transducers in accord with the various implementations herein. For example, the point 210 is representative of a transducer having an outer dimension (cone and suspension) of about 8.0 mm, the point 220 is representative of a transducer having an outer dimension (cone and suspension) of about 5.3 mm, and the point 230 is representative of a transducer having an outer dimension (cone and suspension) of about 4.0 mm.

Various additional points 310 are identified that reflect the surface area and figure of merit for conventional transducers. Accordingly, the example transducers described according to implementations herein achieve a significantly higher compliance for a given diaphragm size than conventional transducers. Further, each of the conventional transducers represented by the points 310 has a stiffness (spring constant) higher than about 30 N/m, and those smaller than 8.0 mm outer diameter have a stiffness higher than 50 N/m. By contrast, the example transducers herein (such as at points 210, 220, 230) achieve a stiffness of 35 N/m or less, in many cases 25 N/m or less, and in some cases, approximately 8 N/m or less. For reference, an acoustically effective diameter (generally larger than an actual cone diameter, as described above) is shown on the lower X-axis of the graph 200.

As noted herein, the transducers (drivers) disclosed according to various implementations can enhance performance relative to conventional microspeakers. These drivers include a highly compliant (i.e., low stiffness) surround or suspension. At least one benefit of such high-compliance transducers is their broader spectral output when compared with conventional microspeakers, e.g., a higher acoustic displacement and output power across a larger range of frequencies, enabling louder output at lower frequencies. That is, the transducers disclosed according to various implementations provide the technical effect of enhancing spectral output when compared with conventional transducers.

One or more components in the driver(s) can be formed of any conventional loudspeaker material, e.g., a heavy plastic, metal (e.g., aluminum, or alloys such as alloys of aluminum), composite material, etc. It is understood that the relative proportions, sizes and shapes of the transducer(s) and components and features thereof as shown in the FIGURES included herein can be merely illustrative of such physical attributes of these components. That is, these proportions, shapes and sizes can be modified according to various implementations to fit a variety of products. For example, while a substantially circular-shaped driver may be shown according to particular implementations, it is understood that the driver could also take on other three-dimensional shapes in order to provide acoustic functions described herein.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. An electro-acoustic driver, comprising:

a diaphragm having a surface area configured to radiate acoustic energy;

a suspension coupled to the diaphragm, wherein the suspension is non-planar in a resting position; and a support structure coupled to the suspension and having an outer linear dimension in a plane of the support structure of approximately 6.0 millimeters (mm) or less, wherein the surface area of the diaphragm is at least 49% of an overall cross-sectional area of the electro-acoustic driver in the plane of the support structure; and wherein the suspension between an inner side wall of the support structure and the diaphragm has a rounded shape in the resting position.

2. The electro-acoustic driver of claim 1, wherein the suspension has a half-rolled shape in the resting position.

3. The electro-acoustic driver of claim 1, wherein the suspension is coupled with the inner side wall of the support structure.

4. The electro-acoustic driver of claim 1, wherein the suspension provides a stiffness of approximately 10 N/m or less, or approximately 8 N/m or less.

5. The electro-acoustic driver of claim 1, wherein the support structure is circular, and wherein the outer linear dimension comprises a diameter of the support structure as measured in a direction perpendicular to an axis of motion of diaphragm while radiating acoustic energy.

6. The electro-acoustic driver of claim 1, wherein the suspension provides a stiffness of approximately 35 Newton/meter (N/m) or less, and wherein the stiffness enhances a spectral output of the electro-acoustic driver.

7. The electro-acoustic driver of claim 1, wherein the suspension comprises an elastomer.

8. The electro-acoustic driver of claim 7, wherein the elastomer is molded.

9. The electro-acoustic driver of claim 7, wherein the surface area of the diaphragm has a portion that is not covered by the elastomer.

10. The electro-acoustic driver of claim 1, wherein the suspension provides a stiffness of approximately 25 Newton/meter (N/m) or less, and wherein the surface area is from approximately 7 square millimeters ($mm^2$) to approximately 40 $mm^2$.

11. The electro-acoustic driver of claim 10, wherein an outer dimension of the suspension is from approximately 2 mm to approximately 10 mm.

12. The electro-acoustic driver of claim 11, wherein the driver defines an acoustic volume of approximately 45-90 cubic millimeters, and wherein the stiffness of the suspension is maintained at or below approximately 25 N/m while the electro-acoustic driver radiates acoustic energy at up to approximately 130 decibels of sound pressure level (dBSPL) to approximately 145 dBSPL.

13. The electro-acoustic driver of claim 11, wherein the surface area is less than approximately 40 $mm^2$.

14. The electro-acoustic driver of claim 1, wherein a ratio of the surface area to a stiffness of the suspension is at least approximately 50 dB relative to 1 millimeter cubed per Newton (1 $mm^3$/N).

15. The electro-acoustic driver of claim 1, wherein a ratio of the surface area to the stiffness of the suspension is 360 $mm^3/N$ or greater.

16. The electro-acoustic driver of claim 1, wherein the surface area of the diaphragm is non-planar and acts as a piston in radiating acoustic energy, wherein the non-planar diaphragm is dome-shaped.

17. An earphone with in-ear active noise cancelation comprising the electro-acoustic driver of claim 1.

18. A high-fidelity earphone or a hearing aid comprising the electro-acoustic driver of claim 1.

19. An in-ear audio device, comprising:

a controller; and an electro-acoustic driver coupled with the controller, the electro-acoustic driver comprising:

a diaphragm having a surface area configured to radiate acoustic energy;

a suspension coupled to the diaphragm, wherein the suspension is non-planar in a resting position; and a support structure coupled to the suspension and having an outer linear dimension in a plane of the support structure of approximately 6.0 millimeters (mm) or less, wherein the surface area of the diaphragm is at least 49% of an overall cross-sectional area of the electro-acoustic driver in the plane of the support structure; and wherein the suspension between an inner side wall of the support structure and the diaphragm has a rounded shape in the resting position.

20. The in-ear audio device of claim 19, wherein the suspension has a half-rolled shape in the resting position.

* * * * *